(12) United States Patent
Hansen

(10) Patent No.: US 8,024,586 B2
(45) Date of Patent: Sep. 20, 2011

(54) DETERMINING POWER REQUIREMENTS BY REQUESTING AUXILIARY POWERED MEMORY FOR SERVER'S EACH ONBOARD COMPONENT'S NEED

(75) Inventor: Peter Hansen, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 611 days.

(21) Appl. No.: 12/124,950

(22) Filed: May 21, 2008

(65) Prior Publication Data

US 2008/0313476 A1    Dec. 18, 2008

Related U.S. Application Data

(60) Provisional application No. 60/943,395, filed on Jun. 12, 2007.

(51) Int. Cl.
*G06F 1/26* (2006.01)
(52) U.S. Cl. .................................................. 713/300
(58) Field of Classification Search ...................... None
See application file for complete search history.

(56) References Cited

U.S. PATENT DOCUMENTS

| 7,469,351 B2* | 12/2008 | Baba et al. ................. 713/300 |
| 2008/0050644 A1* | 2/2008 | Christensen et al. .......... 429/50 |
| 2008/0168283 A1* | 7/2008 | Penning ....................... 713/310 |

* cited by examiner

*Primary Examiner* — Kenneth Kim

(57) ABSTRACT

By supplying auxiliary power to a blade's optional components, instead of polling the blade for the power requirements of a fully configured module, each installed component can be individually polled and the values summed to produce a more accurate value representing the actual power needs of a blade system prior to booting.

6 Claims, 2 Drawing Sheets

DETERMINING POWER REQUIREMENTS BY REQUESTING AUXILIARY POWERED MEMORY FOR SERVER'S EACH ONBOARD COMPONENT'S NEED

CROSS REFERENCE TO RELATED APPLICATIONS

This application claims priority to U.S. Provisional Application No. 60/943,395, filed 12 Jun. 2007, entitled "Method of Determining Computing Module's Power Requirements."

FIELD OF THE INVENTION

The described subject matter relates generally to server-based computing environments, and more particularly to systems and methods of determining computing modules' power requirements.

BACKGROUND

A blade-based system (system) may employ a plurality of server blades (blades) arranged in a common chassis to deliver high-density computing functionality. This common chassis may include one or more common sub-systems such as power sources comprising one or more power modules, or I/O sources comprising multiple networking modules. A fully configured blade may have several optional components, including but not limited to hard drives, memory, daughter cards, etc. The power needs of these components may significantly increase the power requirements of a base blade. Systems must ensure that there are sufficient resources, prior to a blade powering on, to prevent overtaxing the system resources and possibly causing a failure of one or more sub-systems. A system further includes a chassis management processor, which monitors resources and controls operation of the blades. Since a blade may contain optional components, the chassis management processor assumes a 'worst case' scenario (max power) for a blade when determining if the blade may safely power on. If there are insufficient resources to accommodate the worst case scenario, then a blade may not be permitted to power on, even if the actual power requirements of the blade could be accommodated. This results in a waste of system resources as the system may be underutilized. Thus, a power management system that operates on the assumption of a max power configuration would be artificially and needlessly constrained. More sophisticated systems and methods based on predicting the actual power requirements of the blade will help minimized underutilization in power management systems.

DETAILED DESCRIPTION

Figure 1:
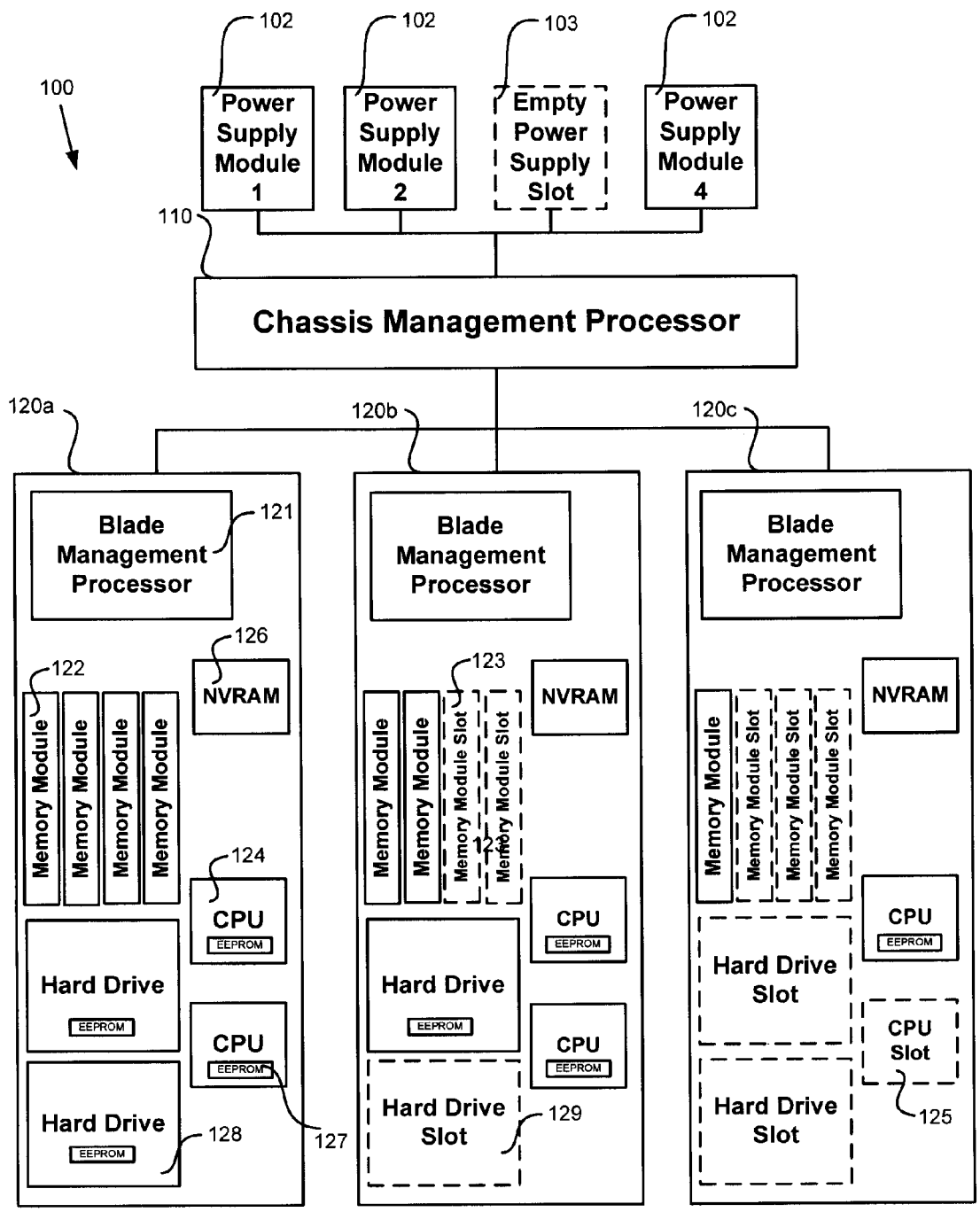
FIG. 1 is a block diagram of an embodiment of a blade-based system.
Figure 2:
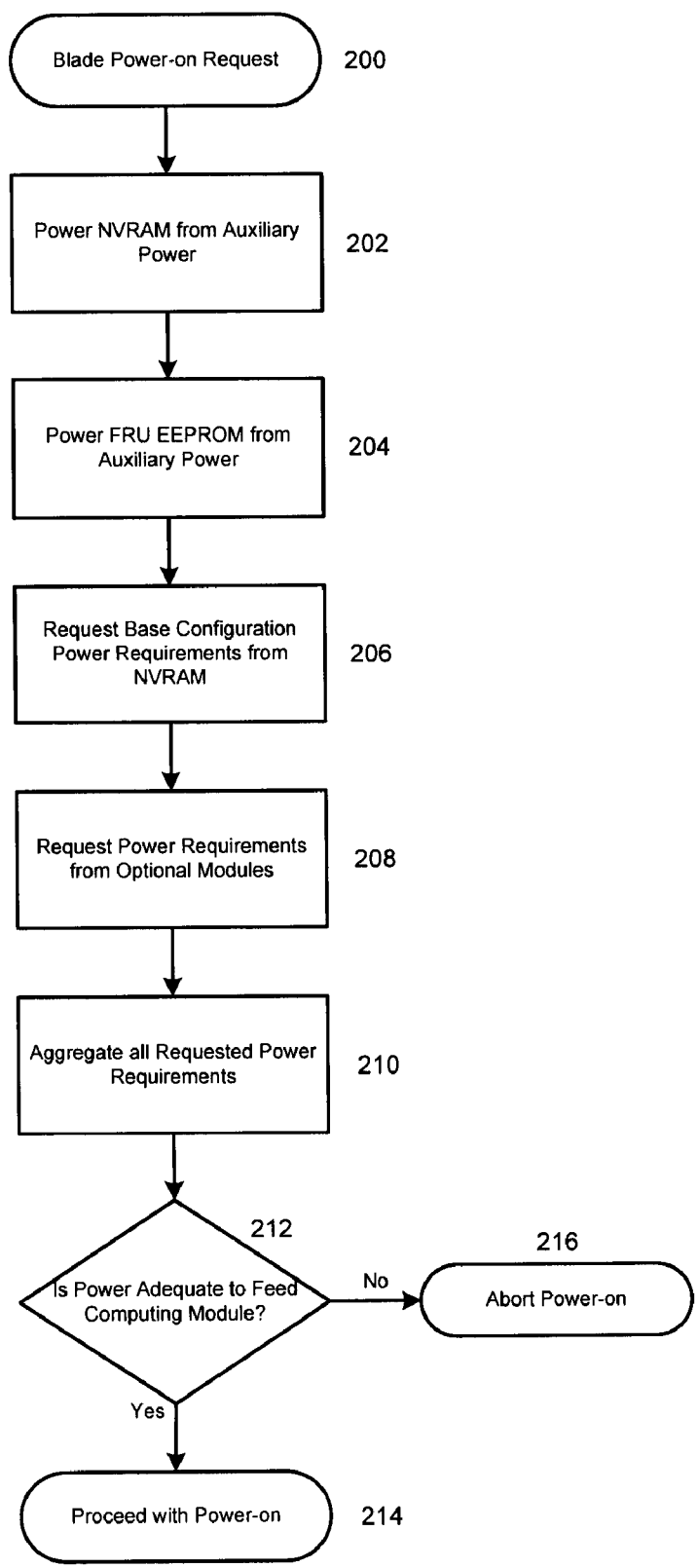
FIG. 2 is a flowchart of determining computing modules power requirements.

By providing auxiliary power to all optional components in the blade server, each component can be identified and polled by a management processor before the blade is allowed to power-on. This operation provides for an accurate prediction of the blade server's power needs because there is visibility into the blade server, thereby allowing the system to determine the blade's actual configuration rather than relying solely on its maximum configuration.

In an exemplary system, a blade (120) may contain a management processor (121) which is powered from auxiliary power when the blade is inserted into a chassis, even when the blade is powered off. The management processor (121) monitors the power-on signal for the blade server, which may be a switch closure. When a power-on signal is detected, the management processor (121) formats a power on request as a packet containing the power requirements of the blade (120). The power requirement is stored in an onboard Non-Volatile Random Access Memory (NVRAM) (126). This packet is transmitted across a bus to the chassis's management processor (110) where a determination is made to allow or deny the power on request based on resource availability of the chassis. To format the power on request, the management processor (121) must know the power requirements of the blade (120). In a typical blade, the management processor has no way to know the actual power requirements of the blade, so it will use a 'worst case' value based on what would be required for a fully populated maximally configured blade. This value would be predetermined and stored in the NVRAM (126) Depending on the actual optional components (122, 124, and 128) currently configured for the blade, the real power requirements may be much less. A situation may exist where a blade is not allowed to power on because its maximum power needs cannot be accommodated by the current power resources of the chassis's power source.

Optional Blade components, also known as Field Replaceable Units (FRUs) (122, 124, 128), contain Electrically Erasable Programmable Read-Only Memory (FRU EEPROM) (127). In an exemplary embodiment, FRU EEPROMS (127) may be powered through auxiliary power, making them assessable before a blade (120) is powered on. In an embodiment such as this, a blade's power request will more accurately represent the actual power requirements of the blade. In one embodiment the determining of the power request value may be accomplished by having the blade's management processor (121) query the FRU EEPROMS (127) and aggregate the individual values into a single value representative of the blade's actual power requirement. In another embodiment a blade may continue to request the max power value, and the chassis's management processor (110) may then query the FRU EEPROMS (127) to determine what is not present, deducting pre-determined amounts from the value requested by the blade for optional components which do not appear to be present.

In another embodiment, a chassis management processor (110) maintains an internal database fed from all the FRU EEPROMs (127) of nearly every component housed therein. Within the enclosure, subcomponents must 'ask' for an allocation of power before the management processor will budget the power and allow a subcomponent to power on. A problem arises because modular subcomponents with one or more optional sub-assemblies (e.g., processors or interface technology mezzanines) have difficulty estimating how much power they will consume. Since the subcomponent is not powered yet, it will ask for a budget of max power as if it were fully populated. The subcomponent will re-estimate its power consumption and adjust that number only after completion of the power-on sequence. The system and methods described in this application allow the blade enclosure's management processor, upon receiving this power request from the subcomponent, to reevaluate the power request by using the FRU information read from the components' Electrically Erasable Programmable Read-Only Memory (EEPROM) (127) and to re-estimate (typically downward) the initial power budget.

FIG. 1, shows an exemplary server-based system 100 to illustrate power management therein. The server-based system (100) comprises a plurality of blade servers (120a, 120b, 120c), each having at least one central processing unit (CPU, processor) (124) operable to process data. Each server may also comprise a plurality of onboard components including at least one NVRAM module (126), optional modules (e.g., optional memory module (122), optional CPU (124), and optional hard drive (128)) some of which have FRU EEPROMs (127). The blade servers (120a-120c) also contain expansion slots (123, 125, 129) where additional hardware may be added to system. Each component and module within the server is operable to respond to requests from at least one management processor (110, or 121). Further, the system has a plurality of power supplies (102), which supply power to the blade servers and are also capable of providing auxiliary power to the NVRAMs (126) and the FRU EEPROMs (127).

In FIG. 1, the left most blade (A) (120a) is fully configured, The left most blade (C) (120c) is minimally configured, and the center blade (B) (120b) is neither fully nor minimally configured. As an example, assume four power supplies (102) would be needed to accommodate power requirements of three fully configured, 'worst case' blades. But, the three power supplies (102) as shown are adequate to accommodate the power requirements of the blades (120a-120c) as they presently configured.

If a user attempts to power in the order C followed by B, then A, all three blades will be allowed to turn on. Blade C will request max power, once up it will adjust its power requirements to reflect its minimal configuration. Then blade B will do the same. Finally, blade A will request max power, and once up, make no adjustments because it actually consumes the maximum power.

When a user attempts to power in the reverse order, that is A, followed by B, then C, the system will not allow blade C to power on in an effort to prevent overtaxing of the power subsystem. This will occur because blade A will request the max power, and once up, make no adjustments. Thereafter, blade B will request the max power, and once up will make adjustments to reflect its actual configurations. However, when blade C attempts to power up, its request for max power will be denied because the chassis not have enough power left to grant the request.

Employing the methods described by the applicant, the actual configuration of blade C would be examined and the appropriate values used, instead of an artificially high max power, and the blade would be allowed to power up.

In one embodiment, a Chassis Management Processor (110) may be configured to discount power requests originating from servers that are not yet on. This would be necessary in blades (120a-120c) in which the Management Processor (121) is not configured to properly assess actual power requirements of the blade. These Management Processors (121) may be configured, simply to read the predetermined max power value from the NVRAM (126) and format it into the power request packet. In this embodiment, the Chassis management Processor, (110) would be able to determine if the blade management processor (121) had pre-discounted the power request in a number of ways. In one embodiment this may be accomplished by a version number submitted in the power request packet. In another embodiment, this may be accomplished by a separate packet indicating the programming configuration, such as a version number, of the blade management processor. In another embodiment, the Chassis Management Processor may compare the value submitted in the power management request with the raw value contained in the NVRAM, which may already be contained in its internal power database.

FIG. 3 illustrates a flow diagram for determining a blade module's power requirements prior to actual power on. The process begins in step 200 after the decision is made to power up a component in a blade enclosure.

In step 202, the blade's onboard NVRAM is powered from auxiliary power available in the system. Likewise, in step 204, FRU EEPROMs present on the blade are powered from an auxiliary power source. This is because the management processor must be able to read the FRU EEPROMs located on the server's motherboard, along with all option mezzanine boards. The management processor can leverage the FRU information learned from the EEPROMS to re-estimate the blade's power request since, in many respects, it knows the hardware inventory of the server blade, even when the blade is off.

In step 206, the base configuration power requirement for the blade is requested from the onboard NVRAM. Step 208 illustrates a request for the power requirements of the optional modules that are installed on the blade as configured.

In step 210, all the power requirements requested in steps 206 and 208 are combined in order to determine the power requirement of the blade as configured. In step 212, the management processor determines if the current power supply configuration is adequate to handle the power requirement of the blade.

If the current power supply configuration is adequate to handle the power requirement of the blade, then the process continues to step 214 where the blade is allowed to power on; if not, the process continues to step 216 where the blade is not allowed to power on.

In one embodiment, the aggregation and power estimation described above occurs in the Blade Management Processor (121) where the value passed to the Chassis Management Processor (110) during the blade power-on request is the actual blade system power requirements. In another embodiment, the power estimation described above occurs in the Chassis Management Processor (110) to discount the max power value passed by the Blade Management Processor (121) during the blade power-on request.

In accordance with the present invention, various embodiments are implemented as a method, system, and/or apparatus. As one example, exemplary embodiments are implemented as one or more computer software programs to implement the methods described herein. The software is implemented as one or more modules (also referred to as code subroutines, or 'objects' in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A server-based computing system comprising:
    a plurality of servers each having at least one processor operable to process data, each of the plurality of servers comprising:
        a plurality of onboard components including at least one NVRAM, and
        optional modules having FRU EEPROMs,
        wherein, each component and module is operable to respond to requests from the at least one processor in a powered-off state;
    a plurality of power supplies, the power supplies operable to:
        supply power to the servers when the servers are in a powered-on state; and
        provide auxiliary power to the NVRAMs and the FRU EEPROMs, wherein the auxiliary power is supplied when the servers are in a powered-off state; and
    a management processor operable to:
        request a base configuration power requirement from an NVRAM of a given server of the plurality of servers in response to a power-on request;
        request a power requirement from each FRU EEPROM of each optional module of the given server in response to receiving the base configuration power requirement; and
        maintain an internal database having all the power requirements.

2. The server-based system of claim 1, wherein the management processor is operable to:
    aggregate all power requirements to determine actual power requirements based on an actual blade configuration of the server-based computing system; and
    determine an actual blade configuration upon aggregating all power requirements.

3. The server-based computing system of claim 2, wherein the power supplies allow servers to power-on based on the determined actual server configuration.

4. The server-based computing system of claim 1, wherein the servers are blade servers.

5. A method of determining a blade computing module's power requirements in a blade server system comprising:
    powering the blade's onboard NVRAM from auxiliary power when the blade is in a power-off state;
    powering the blade when the blade is a power-on state, wherein the blade consumes more power in the power-on state than in the power-off state;
    powering each of a plurality of optional module's FRU EEPROMs of the blade from auxiliary power when the blade is in the power-off state;
    requesting base configuration power requirements from the blade's onboard NVRAM in response to a power-on request from the blade;
    requesting power requirements of each one of the plurality of optional modules from FRU EEPROMs upon receiving the configuration power requirements; and
    aggregating the requested power requirements to determine the actual power requirements for the blade as configured.

6. A computer readable medium having computer executable instructions for performing a method, the method comprising:
    powering a blade's onboard NVRAM from auxiliary power when the blade is in a power-off state;
    powering the blade when the blade is a power-on state, wherein the blade consumes more power in the power-on state than in the power-off state;
    power each of a plurality of optional module's FRU EEPROMs of the blade from auxiliary power when the blade is in the power-off state;
    request base configuration power requirements from the blade's onboard NVRAM in response to a power-on request from the blade;
    request power requirements of each one of the plurality of optional modules from FRU EEPROMs of the blade upon receiving the base configuration power requirements; and
    aggregate the requested power requirements to determine the actual power requirements for the blade as configured.

* * * * *